Nov. 21, 1967 D. F. WILLIAMSON 3,354,368
CONTROL SYSTEM FOR SYNCHRONOUS MOTOR
Filed Jan. 28, 1965 4 Sheets-Sheet 2

FIG. 2

INVENTOR.
DENNIS FRANCIS WILLIAMSON
BY James C. Davis Jr.
HIS AGENT

OSCILLOGRAM OF FIELD CURRENT AND VOLTAGE
DURING ACCELERATION

OSCILLOGRAM SHOWING STARTING PERFORMANCE OF A 300 H.P., 24 POLE SYNCHRONOUS MOTOR

FIG. 5

3,354,368
CONTROL SYSTEM FOR SYNCHRONOUS MOTOR
Dennis Francis Williamson, Peterborough, Ontario, Canada, assignor to Canadian General Electric Company, Limited, Toronto, Ontario, Canada, a corporation of Canada
Filed Jan. 28, 1965, Ser. No. 428,722
16 Claims. (Cl. 318—176)

This invention relates to a system for exciting and controlling synchronous motors.

Large polyphase synchronous motors of the type employed in industry to drive heavy loads are typical of the machines coming within the scope of this invention. Generally, these motors have stator windings energized with AC, and rotor windings energized with DC. In effect, the AC produces a rotating magnetic field which interacts with the unidirectional magnetic field produced by the DC so as to cause the rotor to rotate in synchronism with the AC frequency. However, before synchronous operation can take place, it is necessary to bring the rotor up to speed by an auxiliary means such as a squirrel cage winding on the rotor to make the machine self-starting as an induction motor. During the period of rotor acceleration from standstill to near synchronous speed, the rotor windings are short-circuited by a resistor to keep the voltage induced in these windings from rising to destructive values. Once synchronous speed is nearly attained, the resistor is removed and the DC is applied to the rotor windings, after which the rotor quickly pulls into step with the rotating AC field. Other methods for starting a synchronous motor are known, but they will not be considered here because the practice of this invention involves the use of a field discharge resistor.

As is well known, the success of the synchronous motor is intimately linked with the methods developed for starting the motor. To start a motor, a routine had to be memorized by the operator to be sure the field was shorted before energizing the motor, and, then, to remove the short before applying the field. This system worked as long as the operator devoted his full attention to the job and did not get out of phase with the switching sequences. The next step in the development was automatic field application which led to many circuits of varying degrees of complexity and success of operation, but now at least, a synchronous motor could be started automatically and synchronized without personal supervision.

For high inertia loads, e.g., fan loads and ball mill loads, large induction torques are required in order to accelerate the motor close enough to synchronism to allow successful pull-in. If the field is applied under the most favorable conditions of speed and rotor angle, the motor has the best chance of pulling into synchronism. The most favorable angle occurs very near the point where induced field current is zero and just changing polarity. At this moment stator and rotor flux linkages are maximum; therefore, if the DC is applied to the field, excitation current will build up quickly. The synchronous torque of the motor is, of course, directly proportional to the excitation current and the sooner it can be established the better. Naturally, the rotor slip speed must be checked also, for if the rotor speed is too low an unreasonably large torque would be required to provide acceleration up to synchronous speed. The motor designer specifies the maximum slip from which synchronism may be attempted successfully.

As rotor speed nears synchronism, the induction torque from the squirrel cage winding is very rapidly decreasing.

In many designs, the only effective torque existing at this time is that provided by the DC winding. This torque can be maximized by arranging to have total field resistance equal to field reactance at the slip frequency where synchronism will be attempted. Since field resistance is determined by other factors, an external resistance must be provided to satisfy the maximum torque requirements.

To recapitulate, then, the excitation equipment must perform the following functions:

(1) It must provide a path for induced field current during acceleration;
(2) It must sense rotor speed and rotor angle relative to stator rotating field;
(3) It must monitor the squirrel cage winding temperature and provide protection;
(4) It must apply the field at the most suitable instant and remove the discharge path;
(5) It must check to see that excitation voltage is available and provide protection if not.

One further requirement that has not been mentioned is the provision for protection for pull-out conditions. Protection against pull-out can be provided entirely independent of the excitation system. However, it can be incorporated with the excitation system and this then may be one more requirement.

The next step in the evolution of the synchronous motor excitation system was to employ static components where possible. Many hybrid designs have been produced which attempted to marry silicon rectifiers to electromechanical field application equipment, such as magnetic contactors for connecting and disconnecting the discharge resistor and applying the DC field current. Although these systems have met with considerable success, they have not, in most cases, been completely static in the true sense; therefore, they have not realized all the advantages possible in a static system.

Therefore, an object of this invention is to provide a static system for exciting, controlling the starting, and regulating the operation of a synchronous motor.

Another object of the invention is to incorporate in the static system control devices for protecting the motor during abnormal starting and operating conditions.

Briefly, in accord with one embodiment of the present invention, a starting resistance is connected across the field winding of a synchronous motor in series with two unidirectional current conducting devices connected in parallel, inverse polarity relation and one of the devices is selected to be controllable. The controllable device is triggered only during starting and acceleration so that the synchronous motor starts and accelerates like an induction motor. The polarity of unidirectional current subsequently supplied to the field is chosen so that the other device is reverse-biased and the starting resistance thereby effectively removed from the motor circuit.

A source of unidirectional current for the field winding is provided for normal synchronous operation of the motor after starting and acceleration. The source is energized by alternating current and includes at least one controlled unidirectional current conducting device for supplying unidirectional current to the field winding at a controlled rate during synchronous operation of the motor as determined by the time of initiating conduction, or firing, of the device relative to the cycle of alternating current energizing the source of unidirectional current. A sensing circuit responsive to rotor speed suppresses firing until the rotor attains nearly synchronous speed.

Thereafter, during normal synchronous operation, a regulating circuit, responsive to the magnitude of unidirection current supplied to the rotor field, controls the rate of firing in inverse relation to the magnitude of rotor current so that the field current is maintained relatively constant. Preferably, a protective circuit, responsive to the frequency of the voltage induced in the field winding, is provided for de-energizing the motor when the starting period exceeds a predetermined maximum safe time.

The novel and distinctive features of the invention are set forth in the appended claims. The invention itself, together with further objects and advantages thereof, may be understood by reference to the following description and accompanying drawings in which:

Figure 1:
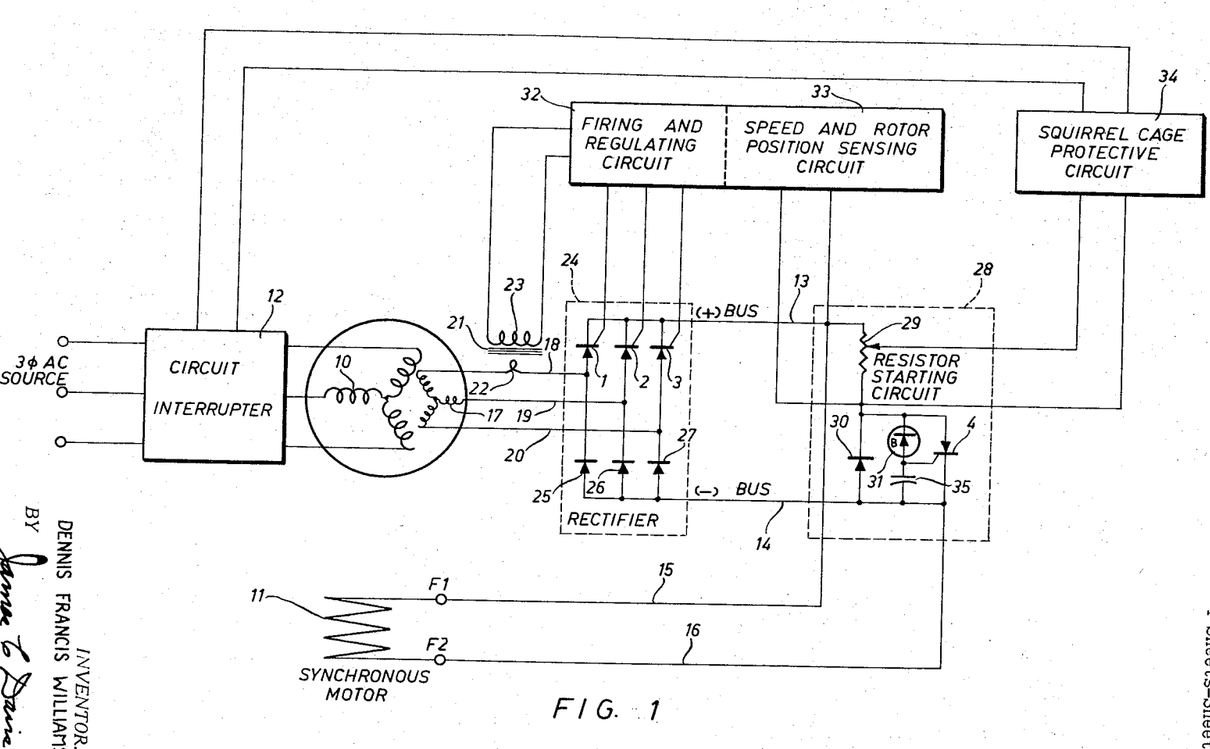
FIGURE 1 is a diagram showing much of the system in block form.
Figure 2:
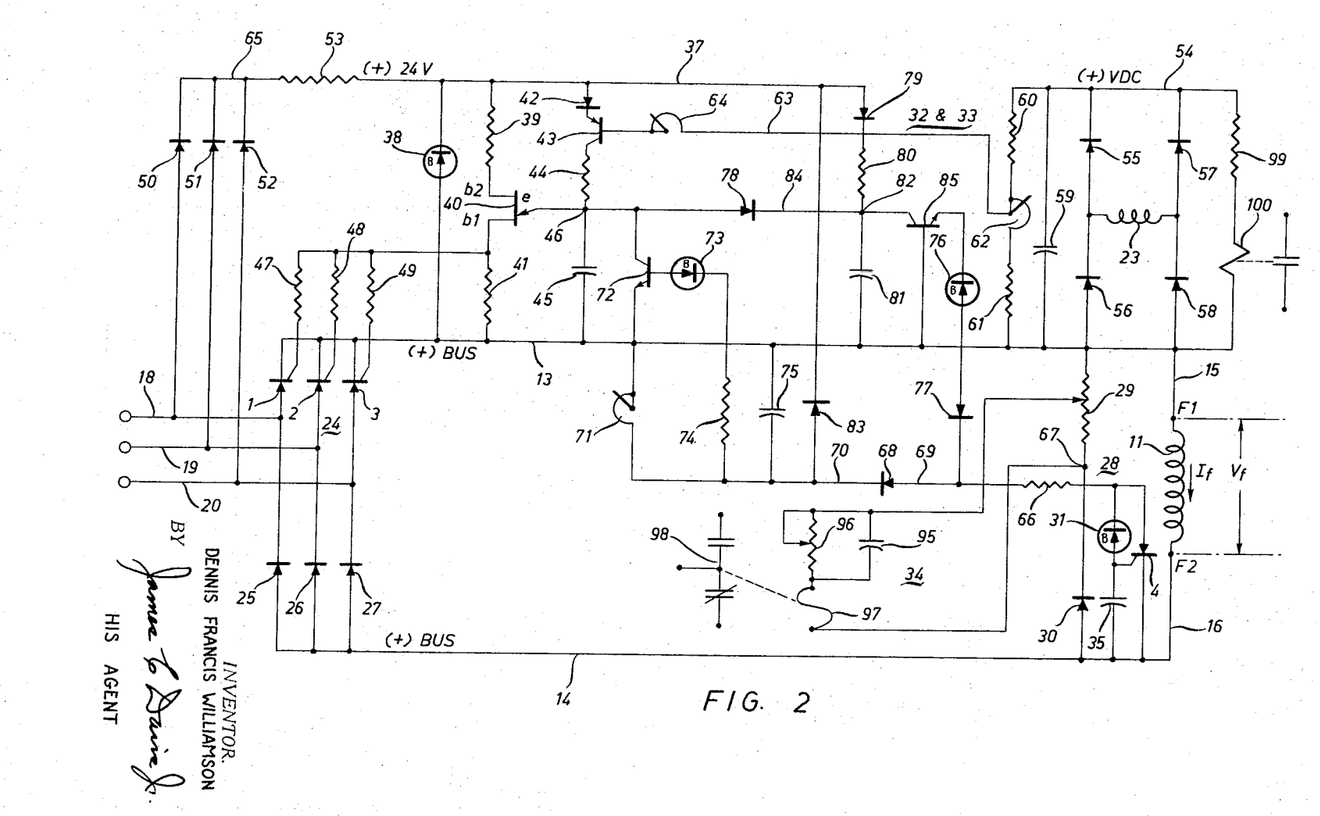
FIGURE 2 is a circuit diagram of the system shown in FIGURE 1.

In FIGURE 1 there is shown a three-phase synchronous motor having a primary winding 10 on its stator and a field winding 11 on its rotor. Winding 10 is energized from a three-phase AC source through circuit interrupter 12 which will open or close the primary circuit in response to control signals; winding 11 is energized with unidirectional current from buses 13, 14 by way of leads 15, 16 connecting the buses to terminals F1 and F2 of the winding. Winding 11 will be referred to hereinafter as the field winding, the field coils or simply the field of the motor. Another three-phase winding 17, known as a tertiary winding, is located on the stator of the motor in some of the same slots as the primary winding. This is a simple transformation winding employed to obtain three-phase energy at a voltage lower than that obtainable from the main AC source. Three leads 18, 19 and 20 connect the tertiary winding to a rectifier 24. Lead 18 includes in series therewith the primary winding 22 of a current transformer 21 of which the secondary winding 23 is connected to the regulating circuit as shown in FIGURE 2.

Rectifier 24 is a modified bridge configuration connected to leads 18, 19 and 20 and buses 13 and 14 so as to convert one half of the three-phase AC wave from the tertiary winding into unidirectional current appearing on buses 13 and 14. The rectifier circuit is modified in the sense that three of the six diodes normally used in a three-phase bridge are replaced by three silicon controlled rectifiers. These devices generally referred to as SCR's, are shown in FIGURES 1 and 2 at 1, 2 and 3, and the three diodes at 25, 26 and 27. It will be noted that the polarities of the SCR's and diodes are such that the SCR's provide conductive paths from leads 18, 19 and 20 to bus 13 for the positive portion of the cycles, and the diodes provide the return paths from bus 14 to the leads. In the circuit illustrated, bus 13 is positive, and bus 14 is negative. As is well known, the portion of each half cycle of current conducted by an SCR depends on its firing time, the later the firing the less current there will be conducted; conduction of the SCR terminates when the cycle falls to zero. This characteristic of the SCR is made use of to control the excitation of the motor as will be explained later.

Also connected across the field 11 of the motor by way of buses 13 and 14 is a resistor starting circuit 28 consisting of a field discharge resistor 29, a diode 30, and an SCR 4. The diode and SCR are connected in parallel in inverse polarity relation, and the parallel combination in series with the resistor in such a way that the diode will conduct field current of one polarity and the SCR field current of the opposite polarity when in a conductive state. A zener diode 31 is used to fire to SCR in a way to be described later.

Circuit 28 is active during motor starting, but once the rotor attains nearly synchronous speed the circuits illustrated by the double box 32, 33 take over and at the proper instant switch off the resistor starting circuit and fire the SCR's in rectifier 24 so as to place unidirectional current on buses 13 and 14 for field 11. Once the field is energized with unidirectional current, the rotor normally pulls into step with the primary flux and the machine now operates as a synchronous motor under the control of the regulating circuit. A separate protective circuit, the box shown at 34, is used to protect the motor in the event its rotor drops out of synchronism due to abnormal conditions such as low primary voltage. If the rotor is unable to get back into synchronism in a certain time, circuit 34 causes interrupter 12 to disconnect the motor from the three-phase source.

The system illustrated in FIGURE 2 will now be examined in more detail, and during the discussion to follow the description of the circuits and their mode of operation will be considered together.

RESISTOR STARTING CIRCUIT

As already pointed out, the resistor starting circuit is active only when the motor is operating as an induction motor during the starting period. Once the rotor attains a speed very near synchronous speed, this circuit is rendered inoperative and at the same instant field current is applied, after which the rotor immediately pulls into synchronism where it remains as long as the operating conditions are normal. The resistor starting circuit 28 connected across field 11 consists of a resistor 29 in series with the parallel combination of diode 30 and SCR 4. It will be noted from FIGURE 2 that this circuit is connected across buses 13, 14 with the anode of diode 30 and the cathode of SCR 4 connected to the negative bus 14 along with terminal F2 of the field winding. The cathode of diode 30 and the anode of SCR 4 are connected to the positive bus 13 through the field discharge resistor. Terminal F1 is connected to the positive bus.

The sequence of events beginning at the moment that the primary winding of the motor is energized with three-phase AC will now be examined. First of all, assume that the rotor of the motor is at rest, the field current is zero, and the field winding is at room temperature. The alternating primary flux will induce a secondary voltage in the field winding of the same frequency as the primary voltage as long as the rotor is at rest, after which the frequency will decrease. When terminal F2 is positive with respect to terminal F1, SCR 4 will not conduct, but diode 30 will and thereby complete a circuit for current to flow from F2 to F1 by way of diode 30 and resistor 29. During the next half cycle when F1 is positive with respect to F2, diode 30 blocks current flow, but the polarity of the induced current is now such that SCR 4 can conduct if in a conductive state. In order to render SCR 4 conductive, current must be introduced to its gate or control electrode. A path for this gating current can be established by the breakdown of the zener diode 31, connected across the anode and gating electrode of the SCR. At the instant before the SCR begins to conduct, the field circuit is essentially open; as a result, the voltage induced in the field coils rises abruptly to the breakdown voltage of the zener diode, whereupon the zener diode allows sufficient current to flow into the gating electrode of the SCR to render the SCR conductive. As soon as the SCR begins to conduct (within 2 or 3 microseconds), the gating current disappears because there is no longer any voltage across the zener diode. The SCR continues to conduct as long as the current flowing from its anode to cathode exceeds a minimum holding value of around 10 to 40 milliamperes. Hence, when the voltage induced in the field coils changes polarity back to F2 positive and F1 negative, the SCR is again in a blocking state. A discharge path is therefore provided through resistor 29 for the alternating current induced in the field winding, the half cycles of one polarity being conducted through diode 30 and the half cycles of the other polarity through SCR 4. A capacitor 35 is connected across the gating electrode and the cathode of the SCR to inhibit firing thereof by rate effects.

Alternate conduction of the diode and the SCR continues at a decreasing rate as the rotor accelerates. The frequency of the induced voltage is inversely proportional to rotor speed and becomes zero at synchronous speed. As the rotor accelerates, sensing circuit 33 monitors the frequency of the voltage induced in the field winding, and when the frequency reaches the predetermined value at which field current can be applied to the motor, circuit 33 allows the firing and regulating circuit 32 to take over control of the field. This takes place at a predetermined point in the cycle of the induced current. It must be remembered that speed alone is not the only criterion determining the instant at which changeover can take place; the rotor must also be in a certain favorable relation to the stator at this very instant.

Figure 3:
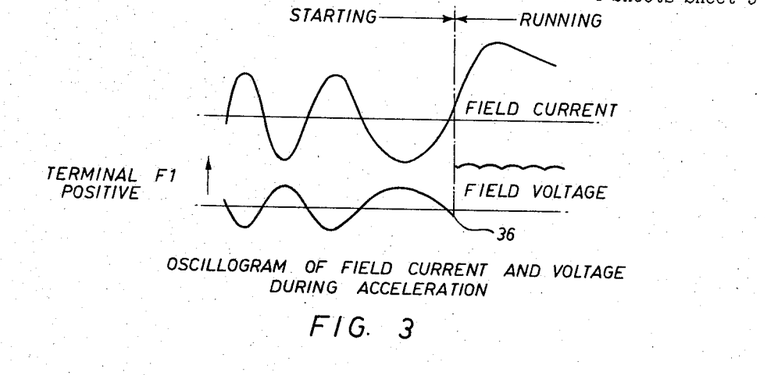
FIGURE 3 is an oscillogram of the field current and field voltage during acceleration of the motor.

Inspection of the oscillogram shown in FIGURE 3 shows that the proper time to begin firing SCR's 1 to 3 of rectifier 24 is immediately after the induced voltage passes through zero in a negative direction, i.e., terminal F1 is just going negative. At this moment, three conditions in the sensing circuit must be satisfied; the period of the last positive half of the induced voltage must be equivalent to the predetermined speed setting, and the polarity of the induced voltage must be negative and near zero. Obviously, if the induced voltage is still positive at terminal F1, SCR 4 would simply continue to conduct when current is supplied to buses 13, 14 by rectifier 24 because the SCR has its anode connected to the positive bus through resistor 29 and its cathode connected to the negative bus as clearly illustrated in FIGURE 2. Consequently, SCR 4 must be given time enough to turn off before any of the SCR's of the rectifier turn on. This is accomplished by suppressing the firing of SCR's 1 to 3 until the positive half cycle of the induced voltage has passed through zero to a slightly negative value. Once SCR 4 has been turned off and SCR's 1 to 3 turned on, the voltage they apply to buses 13, 14 is not high enough to break down zener diode 31; consequently, SCR 4 remains nonconductive as long as rectifier 24 supplies current to field 11. If for any reason during synchronous operation of the motor SCR 4 is turned on, the sensing circuit immediately causes rectifier 24 to turn off and SCR 4 to regain its blocking ability as the voltage of rectifier 24 goes through zero. Point 36 in FIGURE 3 illustrates graphically the time that SCR 4 is turned off and SCR's 1 to 3 turn on.

Once synchronous operation of the motor is established, the bridge type rectifier converts alternating current from the tertiary winding into unidirectional current for field excitation. Initially, the field winding is at room temperature, but as time passes, its resistance increases from the heat generated. Consequently, the regulating circuit must be capable of exercising control over the field current, which it does through control of the firing of SCR's 1 to 3. This is done by advancing or retarding firing of the three SCR's as necessary to hold the field current at the proper value.

FIRING AND REGULATING CIRCUIT

The circuit employed to fire SCR's 1 to 3 is essentially the firing circuit described in the applicant's copending United States application, Serial No. 377,624, filed June 24, 1964, and assigned to the assignee of the present invention. Referring to FIGURE 2, the firing circuit consists of a circuit having three legs connected in parallel between a bus 37 and bus 13; the first leg has a zener diode 38 only; the second leg has a resistor 39, the base electrodes of a unijunction transistor 40, and a resistor 41 connected in series; and the third leg has a diode 42, the emitter and collector of a transistor 43, a resistor 44, and a capacitor 45 connected in series. The emitter of the unijunction transistor is connected to a point 46 between resistor 44 and capacitor 45. The regulating portion of the system consists of a circuit having four legs connected in parallel between a conductor 54 and bus 13; the first leg has a resistor 60, a potentiometer 62 and a resistor 61 connected in series; the second leg has a capacitor 59 only; the third leg has diodes 55 and 56 connected in series; and the fourth leg has diodes 57 and 58 connected in series. One terminal of secondary winding 23 of the current transformer is connected between diodes 55 and 56, and the other terminal of the winding is connected between diodes 57 and 58. It will be noted that the four diodes and the winding are arranged in the form of a full wave, bridge type rectifier wherein conductor 54 is positive. Capacitor 59 filters the DC output from the bridge rectifier. Resistors 60, 61 and potentiometer 62 constitute a voltage divider energized by the output from the bridge rectifier. A lead 63 connects the slider of the potentiometer to the base of transistor 43 through a gain control 64. A definite proportion of the voltage appearing across the bridge can be selected by adjusting the slider of potentiometer 62; this voltage can then be adjusted to a finer degree by means of gain control 64 to obtain the value required for application to the base of the transistor.

The positive voltage on bus 37 is obtained from another bridge type rectifier consisting of diodes 50 to 52 connected between conductor 65 and leads 18 to 20 and interconnected with bridge rectifier 24. The polarity of diodes 50 to 52 is such that they conduct positive half cycles of current supplied by the tertiary winding, and diodes 25 to 27 provide the return path. Since the two bridges are interlocked electrically, periods prior to conduction of SCR's 1 to 3 will result in relatively high voltage peaks appearing between conductor 65 and bus 13; therefore, to avoid excessive current flow through zener diode 38 on breakdown thereof, a current limiting resistor 53 is placed between conductor 65 and bus 37. This resistor and zener diode constitutes a voltage stabilizing circuit which maintains a relatively constant voltage between buses 37 and 13, in this particular instance 24 volts positive on bus 37. This voltage is maintained only during intervals beginning at the instant that an SCR would conduct if it were in a conductive state and ending at the instant that the SCR begins to conduct. Once an SCR conducts, bus 13 assumes essentially the same potential as conductor 65 in reference to bus 14.

The operation of the firing and regulating circuit will now be considered. The current conducted by transistor 43 passes from bus 37 through diode 42, from emitter to collector of the transistor, through resistor 44, and then into charging capacitor 45. When the capacitor has been charged to the breakdown voltage of unijunction transistor 40, emitter $e$ to base $b_1$ of the unijunction transistor provides a conductive path through which the capacitor can readily discharge; included in the discharge path is a resistor 41 across which a voltage pulse now appears. Since each one of the resistors 47 to 49 is in series with the gate to cathode electrodes of an SCR and the combination is connected across resistor 41, the voltage is applied to all three SCR's. Resistors 47 to 49 balance the circuit so the pulse is shared equally by the three gating electrodes. All three SCR's are therefore fired simultaneously, but only the one subjected to the highest positive voltage on its anodes at this time conducts; although fired, the other two SCR's are not rendered conductive. Hence, each time that capacitor 45 discharges, one of the SCR's in bridge 24 conducts, and unidirectional current is passed to the field winding via buses 13 and 14.

The unijunction transistor is a three-terminal semiconductor exhibiting the unique property of being able to withhold at its emitter junction a voltage which is lower and proportional to the interbase voltage. A very small reverse current will flow from the emitter when the voltage impressed on the emitter base $b_1$ junction is lower than the interbase voltage times a constant known as the intrinsic stand off ratio of the device, but as soon as the emitter-base $b_1$ voltage exceeds the interbase voltage the emitter-base $b_1$ junction conducts readily; as a result, the current in the emitter circuit rises abruptly with no further increase in the emitter-base $b_1$ voltage and even continues to rise as this voltage falls off. For further particulars on the type of unijunction transistor suitable for use at 40 reference is made to the General Electric Company Transistor Manual, 6th edition, chapter 13. In the circuit illustrated, the current flowing from the collector of transistor 43 charges capacitor 45 to the voltage at which the unijunction transistor becomes conductive, after which the capacitor discharges through the emitter-base $b_1$ junction of the unijunction transistor. On discharge of capacitor 45, its voltage drops to a value at which transistor 40 returns to its former nonconductive state, thereby completing one firing pulse for SCR's 1 to 3.

Resistor 44 is placed in the collector circuit of transistor 43 to limit current flow from the collector to a value which will permit the unijunction transistor to oscillate. If this current becomes too high, the unijunction transistor will not oscillate; consequently, the value of the resistance selected is great enough that oscillation of the unijunction transistor is not disturbed. Diode 42 has been provided to prevent reverse current flow through transistor 43 from other parts of the control system. Resistor 39 in series with base $b_2$ of transistor 40 provides a measure of temperature compensation for the emitter $e$-base $b_1$ junction.

Since conduction of transistor 43 determines the rate at which capacitor charges, it also determines the firing rate of the unijunction transistor. The transistor therefore can be used to control the firing delay of SCR's 1 to 3 and thereby the current flowing from rectifier 24 to field 11. Conduction of current from emitter to collector can be regulated by regulating the current flowing out of the base; in the configuration illustrated in FIGURE 2, the base is the control element of the transistor. The base current can be varied by the voltage applied to the base from potentiometer 62. When the voltage at the wiper of potentiometer 62 is lower than the voltage on bus 37, a certain current will flow out of the base of transistor 43, allowing a discrete value of current to flow out of the collector of the transistor. Raising the voltage at 62 reduces the base current and this in turn reduces the collector current. Conversely, lowering the voltage at 62 will increase the base and collector currents. Hence, the value of the collector current, the current available for charging capacitor 45, will vary inversely with the voltage at the wiper of potentiometer 62. The collector current will be referred to hereinafter as the control signal because it is the signal used to control the firing circuit.

It will be noted in connection with FIGURES 1 and 2 that the AC voltage applied to the bridge rectifier comprised of diodes 55 to 59 is the voltage appearing across the secondary 23 of current transformer 21. Since the output voltage of secondary 23 is proportional to the current delivered to rectifier 24 by tertiary winding 17, and therefore the field current at 11, the voltage output of the bridge will also be proportional to field current. The voltage at the wiper of potentiometer 62 is a selected portion of the output of the bridge, because elements 60 to 62 comprise a voltage dividing network also connected across lead 54 and bus 13; consequently, the voltage at 62 varies directly with field current. In the previous paragraph it was seen that the collector current, or the signal controlling firing of the SCR's varies inversely with the voltage at the wiper of potentiometer 62. Therefore, the control signal is inversely proportional to the field current of the motor.

The field current can be set at the desired level by adjusting potentiometer 62 and gain control 64, and once set the regulating circuit will exercise control over the firing circuits so as to maintain the field current at the set level, within limits of course. Even though the resistance of field 11 varies somewhat, as it does for some time after a cold machine is placed in operation, the regulating circuit will maintain the field current within the limits designed into the system; the response of the regulating circuit depends on the current supplied for excitation purpose, and not on field resistance. Resistance must, of course, be considered in designing the circuits because they do affect most circuits in one way or another.

SPEED AND ROTOR POSITION SENSING CIRCUIT

The function of the sensing circuit is to keep SCR's 1 to 3 from being fired until the rotor attains a certain speed and position relative to the stator, that is, the speed of the rotor must be very near the synchronous speed and the rotor in a definite relation to the stator when field current is applied. To suppress firing of the SCR's the circuit keeps the voltage across capacitor 45 well below the firing voltage of unijunction transistor 40. The sensing circuit may be considered as having two parts, one of which senses speed and the other rotor position once the speed is at the proper value.

The speed sensing portion of the circuit has the following components in series: a resistor 66 having one terminal connected to a point 67 between resistor 29 and diode 30 and the other terminal connected to conductor 69, a diode 68 having its anode connected to conductor 69 and its cathode connected to conductor 70, and a potentiometer 71 connected to conductor 70 and to bus 13. The circuit also includes a transistor 72 having its emitter connected to bus 13, its collector to the point 46 between resistor 44 and capacitor 45, and its base connected to conductor 70 through zener diode 73 and resistor 74. A capacitor 75 is connected across conductor 70 and bus 13. A diode 83 has its cathode connected to bus 37 and its anode to conductor 70.

The position sensing portion of the circuit consists of the following: a transistor 85 having its emitter connected to conductor 69 through a zener diode 76 and a diode 77, its collector connected to point 46 through a diode 78, and its base connected to bus 13; a diode 79, a resistor 80 and a capacitor 81 connected in series across buses 37 and 13 with a point 82 between the resistor and capacitor connected to the collector lead 84 of transistor 85.

It will be seen from FIGURE 2 that capacitor 75 is connected across field discharge resistor 29; therefore, it will charge up through resistor 66 and diode 68 only when terminal F2 of the field is positive; diode 68 blocks charging of the capacitor when the polarity of the field reverses. As soon as the voltage on capacitor 75 exceeds the breakdown voltage of zener diode 73, positive current will flow from conductor 70 through the current limiting resistor 74 and the zener diode to the base of transistor 72. This will render the transistor conductive from collector to emitter, and the transistor will now provide a relatively low resistance path for discharge of capacitor 45, thereby keeping the capacitor voltage below the firing voltage of unijunction transistor 40. Diode 83 in conjunction with zener diode 38 and current limiting resistor 66 limit the voltage on capacitor 75 to the value held constant on bus 37.

As soon as the voltage across resistor 29 drops to a value below the voltage on capacitor 75, the capacitor discharges through potentiometer 71 at a rate determined by the resistance of the potentiometer. The rate of capacitor discharge can be set by means of the wiper on the potentiometer. In a very short time the voltage on capacitor 75 will drop to the point where zener diode 73 opens the base circuit of transistor 72, at which time the transistor would cease to be a discharge path for capacitor 45. To keep this from happening the rate at which capacitor 75 discharges is set low enough on potentiometer 71 that the capacitor has had insufficient time to discharge to the recovery voltage of zener diode 73 before the induced voltage has completed a full cycle and the capacitor is again being charged. Since the frequency of the induced field voltage decreases as the rotor accelerates, the interval between the positive half cycles available for charging capacitor 75 increase. Finally, at a rotor speed near the synchronous speed, the capacitor will have time enough to discharge down to the recovery voltage of the zener diode, at which time transistor 72 ceases to be a bypass for capacitor 45. The rotor speed is now high enough that field current can be applied as soon as SCR 4 is turned off.

When the voltage induced in the field winding is positive at terminal F1, as it is when SCR 4 is turned on, a positive current can flow to the base of transistor 85, thereby rendering this transistor conductive from collector to emitter. It will be seen from FIGURE 2 that another path is now provided for discharge of capacitor 45 voltages exceeding the breakdown voltage of zener diode 76. This path includes diode 78, collector to emitter of transistor 85, zener diode 76, diodes 77 and 68, and potentiometer 71. When transistor 85 conducts, any charge on capacitor 81 will also be released. As soon as transistor 85 ceases to conduct due to decay of the positive half cycle of current on its base, capacitor 45 again charges up, but at a reduced rate due to the discharged capacitor 81 in parallel with capacitor 45. Capacitor 81 is part of a delay circuit, including resistor 80 and diode 79, designed to slow down the charging of capacitor 45 so it will not discharge through unijunction transistor 40 until SCR 4 has had time to turn off, i.e., F1 has turned slightly negative. Field excitation is now established under the control of the firing circuit, the rotor pulls into step, and the motor operates as a synchronous motor. Once capacitor 81 is fully charged, diodes 78 and 79 prevent it from exercising further influence on capacitor 45, and as a result, capacitor 81 remains charged while capacitor 45 fires the unijunction transistor.

In the embodiment of the invention illustrated in FIGURE 2, bus 37 is at 24 volts positive and zener diodes 73 and 76 have a breakdown voltage of about 7.5 and 7.0 volts respectively.

Figure 4:
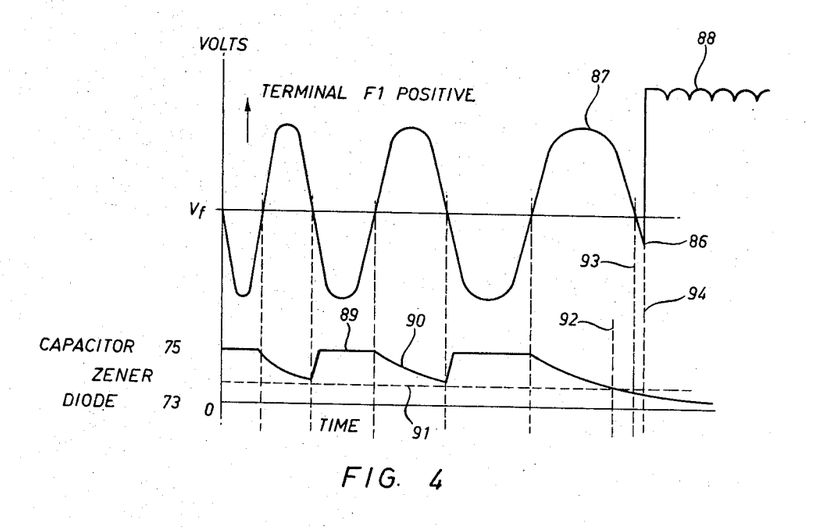
FIGURE 4 is an oscillogram of the field voltage and the voltage of the speed sensing capacitor just before field excitation is applied to the motor.

FIGURE 4 illustrates graphically the conditions to be met by the sensing circuit before switching off the field discharge resistor and applying exciting current to the field winding. Referring to the sine wave, it will be seen that the cycles of voltage $V_f$ induced in the field winding increase progressively in time as the rotor accelerates, and that at a point 86 when the half cycle 87 has completed its positive swing and fallen a little below the zero line into the negative region, field excitation 88 is applied to the motor by rectifier 24. The lower curve represents the voltage on capacitor 75. During the negative half cycles of induced voltage $V_f$ (F2 positive) capacitor 75 is charged to the voltage level 89, and during the positive half cycles (F1 positive) the voltage on the capacitor decays along curve 90 to a level above the recovery voltage 91 of zener diode 73. Each successive voltage decay 90 comes a little closer to level 91 until at time 92 the capacitor voltage drops to the level 91 where zener diode 73 recovers its blocking ability and turns off transistor 72. A fraction of a cycle later at time 93 the positive half cycle 87 has fallen to zero and transistor 85 has also been turned off. After transistor 85 turns off, circuit 81, 80 delays the charging of capacitor 45 so that SCR's 1 to 3 are not fired until time 94 when the induced voltage is at the negative value 86, thereby giving SCR 4 sufficient time to regain its blocking ability.

As pointed out earlier, whenever the firing circuit delivers a pulse to the gates of SCR's 1 to 3, only the one having the highest positive voltage on its anode at this instant conducts; it cuts off again when this voltage drops to zero. Hence, the current delivered to bus 13 will be unidirectional pulses of current. The effective value of the current delivered by the three SCR's will therefore depend on the rate at which firing pulses are delivered to the SCR's, the longer the time between firing pulses the smaller the effective value of the current and vice versa. Consequently, by controlling the rate of firing of SCR's 1 to 3, it is possible to control the magnitude of the field current accordingly.

SQUIRREL CAGE PROTECTIVE CIRCUIT

If, during normal operation of the synchronous motor, the rotor falls out of step, the static control system will immediately switch off the field excitation and switch on the field discharge resistor, and at the earliest opportunity thereafter act in the way described above to bring the rotor back into synchronism. In the event that the static system is unable to restore synchronous operation, the protective circuit now to be described becomes active and will in a short time remove the machine from the line if the conditions causing malfunctioning persist. This protects the squirrel cage winding because it would soon overheat from sub-synchronous operation; usually the squirrel cage winding is designed with sufficient capacity only to accelerate the motor and its load to the synchronizing speed. As a result, this winding will soon overheat if the motor fails to synchronize or falls out of synchronism for any length of time.

The squirrel cage protective circuit shown at 34 in FIGURE 2 consists of a frequency sensitive circuit and a thermally responsive device connected in series across a major portion of the field discharge resistor. A capacitor 95 and a variable resistor 96 connected in parallel constitute the frequency sensitive circuit which is connected in series with the thermal element symbolized by the S-shaped line 97. Thermal element 97 is connected mechanically to contacts 98, and they in turn are connected into the control circuit for circuit interrupter 12. Operation of the thermal element actuates the contacts which then cause the interrupter to disconnect the motor from the three-phase source.

When the motor operates at sub-synchronous speeds, the frequency sensitive network receives energy from the field discharge resistor inversely proportional to rotor speed. The components of the frequency sensitive circuit are selected and adjusted to provide a tripping curve for the thermal element which corresponds to the capabilities of the squirrel cage winding. This curve is tailored to the requirements of the squirrel cage over the speed range of the motor. If at anytime SCR 4 or diode 30 were to fail, current from rectifier 24 will activate the thermal device and cause the motor to be shut down.

Another protective device for the sychronous motor is a pullout relay connected across the bridge rectifier 55 to 58. This relay has its coil 100 connected in series with a resistor 99 across lead 54 and bus 13; it is a voltage sensitive device which is normally energized and which is de-energized in response to low voltage. Since the voltage at the relay is proportional to field current, the relay will operate in the event that the field current falls below a preset value. If, for example, the field current is switched off because the rotor is no longer at synchronous speed, the relay will operate to shut down the motor. The relay has contacts connected in the control circuit of the circuit interrupter. During starting of the motor a timing device deactivates the relay so it will not interfere with starting. This device is set to time out and free the pull-out relay after the motor is up to speed and operating as a synchronous machine.

The usual protective devices can be employed to protect the motor against abnormal conditions such as overcurrent, undervoltage, overvoltage, etc.

Figure 5:
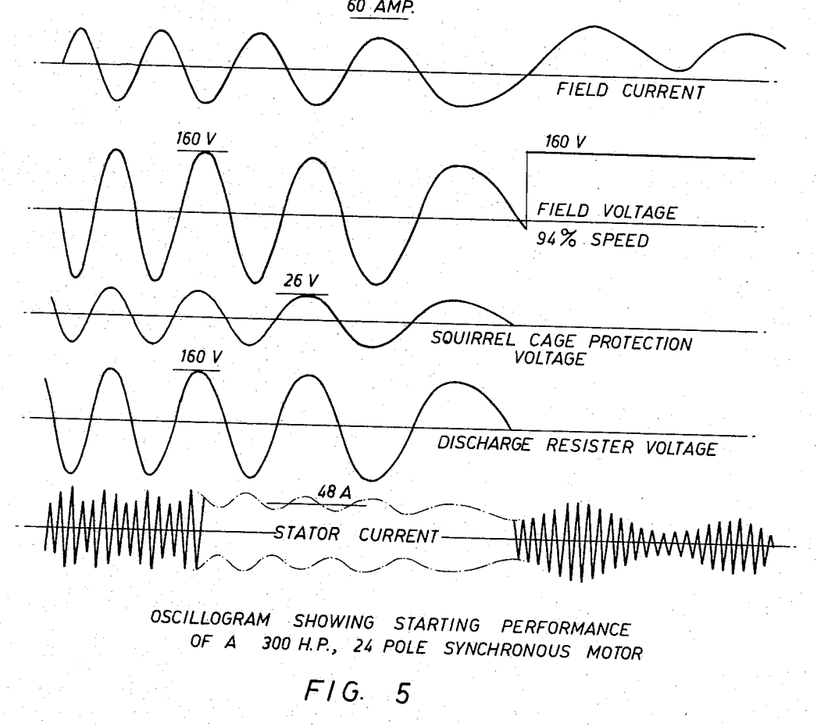
FIGURE 5 is an oscillogram showing the starting performance of a 300-HP, 24-pole synchronous motor.

FIGURE 5 shows an oscillogram of circuit operation while starting a 300-HP, 24-pole compressor motor. The circuit was adjusted to attempt pull-in at 94 percent synchronous speed even though the motor could accelerate to about 98 percent speed as an induction motor. Close observation of the field voltage trace shows that the delay circuit holds off firing pulses long enough to let the induced voltage go through zero as described.

Although the invention has been described with respect to certain specific embodiments, it will be appreciated that modifications and changes may be made by those skilled in the art without departing from the basic teachings of the invention. Therefore, it is desired not to limit the following claims to the specific embodiments shown, but to cover all modifications and changes within the spirit and scope of the invention.

What I claim as new and desire to secure by Letters Patent of the United States is:

1. A system for controlling the starting and the excitation of a synchronous motor having a primary AC winding and a DC field winding comprising a resistance starting circuit having a field discharge resistance and unidirectional current conducting devices for connecting the resistance across said field winding during starting only of the motor; a circuit having at least one controlled unidirectional current conducting device for supplying unidirectional current to said field winding at a controlled rate during synchronous operation of the motor; a firing circuit for intermittently rendering conductive the unidirectional current conducting device of said circuit; a sensing circuit responsive to rotor speed for suppressing firing of said firing circuit at rotor speeds below a predetermined speed set at a value a little below the synchronous speed and allowing firing of said firing circuit at rotor speeds above said predetermined speed; and a regulating circuit responsive to said unidirectional current for controlling the rate of firing of said firing circuit in inverse relaton to the magntude of said unidirectional current, whereby the field current is maintained relatively constant during synchronous operation of the motor.

2. A system for controlling the starting and the excitation of a synchronous motor having a primary AC winding and a DC field winding comprising a resistor starting circuit having a field discharge resistor and unidirectional current conducting devices for connecting the resistor across said field winding during starting only of the motor; a circuit having at least one controlled unidirectional current conducting device for supplying unidirectional current to said field winding at a controlled rate during synchronous operation of the motor; a firing circuit for intermittently rendering conductive the unidirectional current conducting device of said circuit; a sensing circuit responsive to the frequency of the voltage induced in said field winding for suppressing firing of said firing circuit at frequencies above a set frequency near zero and allowing firing of said firing circuit at frequencies below said set frequency; a regulating circuit responsive to said unidirectional current for controlling the rate of firing of said firing circuit in inverse relation to the magnitude of said unidirectional current, whereby the field current is maintained relatively constant during synchronous operation of the motor; and protective circuit responsive to the frequency of the voltage induced in said field winding for de-energizing the motor after a set period of time exceeding the time normally required for starting the motor.

3. A system for controlling the starting and the excitation of a synchronous motor having a primary AC winding and a DC field winding comprising a resistor starting circuit having a field discharge resistor and unidirectional current conducting devices for connecting the resistor across said field winding during starting only of the motor; a circuit having at least one controlled unidirectional current conducting device for supplying unidirectional current to said field winding at a controlled rate during synchronous operation of the motor; a firing circuit for intermittently rendering conductive the unidirectional current conducting device of said circuit, the rate of firing of said firing circuit being inversely proportonal to the magnitude of a control voltage; a regulating circuit for measuring said unidirectional current and converting the measured values into a proportional voltage for use as said control voltage; a sensing circuit responsive to the frequency of the voltage induced in said field winding for suppressing firing of said firing circuit at frequencies above a set frequency near zero and allowing firing of said firing circuit at frequencies below said set frequency.

4. The system defined in claim 3 wherein there is provided a protective circuit responsive to the frequency of the voltage induced in said field winding for de-energizing the motor after a set period of time exceeding the time normally required for starting the motor.

5. A system for controlling the starting and the excitation of a synchronous motor having a primary AC winding and a DC field winding terminating in first and second terminals; said system comprising a field discharge resistor in series circuit with a diode across said terminal with the polarity of the diode such that it conducts when said second terminal is positive; an SCR having its anode connected to the cathode of the diode and its cathode connected to the anode of the diode; means for firing said SCR in response to a positive voltage of a certain value at said first terminal; a rectifying circuit having at least one SCR for converting alternating current to unidirectional current of a voltage appreciably lower than said certain value, said rectifying circuit having its positive side connected to said first terminal and its negative side to said second terminal; a firing circuit for intermittently firing said at least one SCR; a regulating circuit responsive to said unidirectional current for controlling the rate of firing of said at least one SCR in inverse relation to the magnitude of the unidirectional current; and a sensing circuit responsive to the frequency of the voltage across said field discharge resistor for suppressing firing of said firing circuit until the frequency decreases to a value near zero followed immediately by the voltage induced in the field winding going through zero to a slightly negative state at said first terminal.

6. The system defined in claim 5 wherein there is provided a protective circuit responsive to the frequency of the voltage induced in said field winding for de-energizing the motor after a set period of time exceeding the time normally required for starting the motor.

7. The system defined in claim 5 wherein said regulating circuit includes a protective device operative in response to abnormal unidirectional current values for de-energizing the motor.

8. A system for controlling the starting and the excitation of a synchronous motor having a primary AC winding and a DC field winding terminating in first and second terminals; said system comprising a field discharge resistor in series circuit with a diode across said terminals with the polarity of the diode such that it conducts when said second terminal is positive; an SCR having its anode connected to the cathode of the diode and its cathode connected to the anode of the diode; a zener diode having its cathode connected to the anode of said SCR and its anode connected to the gate of said SCR; a rectifying circuit having at least one SCR for converting alternating current to unidirectional current of a voltage well below the breakdown voltage of said zener diode, said rectifying circuit having its positive side connected to said first terminal and its negative side to said second terminal; a firing circuit having a capacitor, means for charging the capacitor at a rate inversely proportional to the magnitude of a control signal, and means for blocking discharge of the capacitor until it is charged to a definite voltage and then allowing the capacitor to discharge momentarily across the gate and cathode of said at least one SCR for firing thereof; a regulating circuit for measuring said unidirectioinal current, producing a control signal representing a control signal representing the magnitude of said unidirectional current, and applying the control signal to said means for charging the capacitor; and a sensing circuit responsive to the frequency of the voltage across said field discharge resistor for maintaining the voltage on said capacitor below said definite voltage until the frequency decreases to a value nearly zero followed immediately by the voltage induced in the field winding going through zero to a slightly negative state at said first terminal.

9. The system defined in claim 8 wherein a motor protective circuit is provided consisting of a frequency sensitive circuit connected across at least a portion of said field discharge resistor; a thermal element energized by the current in said frequency sensitive circuit; and contacts actuated by said thermal element when the current in said frequency sensitive circuit remains above a specified level for an abnormal length of time, said contacts being connected in the primary AC supply so as to de-energize the motor when actuated by the thermal element.

10. The system defined in claim 8 wherein said regulating circuit includes a protective device operative in response to abnormal unidirectional current values for de-energizing the motor.

11. A system for controlling the starting and the excitation of a synchronous motor having a primary AC winding and a DC field winding terminating in first and second terminals; said system comprising a field discharge resistor in series circuit with a diode across said terminals with the polarity of the diode such that it conducts when said second terminal is positive; an SCR having its anode connected to the cathode of the diode and its cathode connected to the anode of the diode; a zener diode having its cathode connected to the anode of said SCR and its anode connected to the gate of said SCR; a rectifying circuit having at least one SCR for converting alternating current to unidirectional current of a voltage well below the breakdown voltage of said zener diode, said rectifying circuit having its positive side connected to said first terminal and its negative side to said second terminal; a firing circuit having a capacitor, means for charging the capacitor at a rate inversely proportional to the magnitude of a control signal, and means for blocking discharge of the capacitor until it is charged to a definite voltage and then allowing the capacitor to discharge momentarily across the gate and cathode of said at least one SCR for firing thereof; a regulating circuit for measuring said unidirectional current, producing a control signal representing the magnitude of said unidirectional current, and applying the control signal to said means for charging the capacitor; a transistor switching circuit connected across said capacitor so as to provide a relatively low resistance path for discharge of the capacitor when the transistor is turned on; a second capacitor connected across said field discharge resistor for charging therefrom, and also connected to said transistor switching circuit for turning the transistor on at a predetermined capacitor voltage; a discharge path for said second capacitor having a resistance high enough to hold the voltage on the capacitor above said predetermined capacitor voltage until the frequency of the capacitor charging voltage decreases to nearly zero; another transistor switching circuit providing a discharge path for said capacitor immediately after said first transistor switching circuit turns off and after the voltage on said capacitor has risen to a value above said predetermined second capacitor voltage but below said definite capacitor voltage; means for connecting the control element of said second transistor switching circuit to said first terminal so the transistor is turned on when said first terminal is positive; and a delay circuit for delaying the charging of said capacitor to said definite voltage for a short time after said second transistor switching circuit has turned off, said delay being just long enough for said first terminal to become slightly negative before the SCR in the rectifying circuit is fired, first giving the SCR in the field discharge circuit time to turn off.

12. The system defined in claim 11 wherein a motor protective circuit is provided consisting of a frequency sensitive circuit connected across at least a portion of said field discharge resistor; a thermal element energized by the current in said frequency sensitive circuit; and contacts actuated by said thermal element when the current in said frequency sensitive circuit remains above a specified level for an abnormal length of time, said contacts being connected in the primary AC supply so as to de-energize the motor when actuated by the thermal element.

13. The system defined in claim 11 wherein said regulating circuit includes a protective device operative in response to abnormal unidirectional current values for de-energizing the motor.

14. A system for controlling the starting and the excitation of a synchronous motor having a primary AC winding and a DC field winding terminating in first and second terminals; said system comprising a field discharge resistor in series circuit with a diode across said terminals with the polarity of the diode such that it conducts when said second terminal is positive; an SCR having its anode connected to the cathode of the diode and its cathode connected to the anode of the diode; a zener diode having its cathode connected to the anode of said SCR and its anode connected to the gate of said SCR; a rectifying circuit having at least one SCR for converting alternating current to unidirectional current of a voltage, well below the breakdown voltage of said zener diode, said rectifying circuit having its positive side connected to said first terminal and its negative side to said second terminal; a firing circuit having a capacitor, means for charging the capacitor at a rate inversely proportional to the magnitude of a control signal, and means for blocking discharge of the capacitor until it is charged to a definite voltage and then allowing the capacitor to discharge momentarily across the gate and cathode of said at least one SCR for firing thereof; a current transformer having its primary in the AC input to said rectifying circuit and its secondary supplying a bridge type rectifier; a potentiometer across the output of said bridge type rectifier; a conductor connecting the slider of said potentiometer to the control element of said capacitor charging means, said control signal being the signal at said slider; a transistor switching circuit connected across said capacitor so as to provide a relatively low resistance path for discharge of the capacitor when the transistor is turned on; a second capacitor connected across said field discharge resistor for charging therefrom, and also connected to said transistor switching circuit for turning the transistor on at a predetermined capacitor voltage; a discharge path for said second capacitor having a resistance high enough to hold the voltage on the capacitor above said predetermined capacitor voltage until the frequency of the capacitor charging voltage decreases to nearly zero; another transistor switching circuit providing a discharge path for said capacitor immediately after said first transistor switching circuit turns off and after the voltage on said capacitor has risen to a value above said predetermined second capacitor voltage but below said definite capacitor voltage; means for connecting the control element of said second transistor switching circuit to said first terminal so the transistor is turned on when said first terminal is positive; and a delay circuit for delaying the charging of said capacitor to said definite voltage for a short time after said second transistor switching circuit has turned off, said delay being just long enough for said first terminal to become slightly negative before the SCR in the rectifying circuit is fired, first giving the SCR in the field discharge circuit time to turn off.

15. The system defined in claim 14 wherein a motor protective circuit is provided consisting of a frequency sensitive circuit connected across at least a portion of said field discharge resistor; a thermal element energized by the current in said frequency sensitive circuit; and contacts actuated by said thermal element when the current in said frequency sensitive circuit remains above a specified level for an abnormal length of time, said contacts being connected in the primary AC supply so as to de-energize the motor when actuated by the thermal element.

16. The system defined in claim 14 wherein a voltage sensitive relay is connected across the output of said bridge type rectifier and operative in response to abnormal voltages to de-energize the motor.

References Cited
UNITED STATES PATENTS

| | | | |
|---|---|---|---|
| 3,098,959 | 7/1963 | Rosenberry | 318—181 |
| 3,100,279 | 8/1963 | Rohner | 318—167 |
| 3,151,288 | 9/1964 | Avizienis | 322—28 |

OTHER REFERENCES

SCR Rectifier Manual, 2nd ed., 1961 (sec. 8.6, pp. 127–129).

ORIS L. RADER, *Primary Examiner.*

G. FRIEDBERG, G. Z. RUBINSON,
*Assistant Examiners.*